(12) United States Patent
Geng et al.

(10) Patent No.: US 12,425,693 B2
(45) Date of Patent: Sep. 23, 2025

(54) DISPLAY CONTROL METHOD AND APPARATUS, AND DISPLAY DEVICE AND COMPUTER-READABLE MEDIUM

(71) Applicant: BOE Technology Group Co., Ltd., Beijing (CN)

(72) Inventors: Lihua Geng, Beijing (CN); Xiaodong Shi, Beijing (CN); Youxiang Xia, Beijing (CN); Xitong Ma, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/283,461

(22) PCT Filed: Jan. 3, 2023

(86) PCT No.: PCT/CN2023/070062
§ 371 (c)(1),
(2) Date: Sep. 22, 2023

(87) PCT Pub. No.: WO2023/131105
PCT Pub. Date: Jul. 13, 2023

(65) Prior Publication Data
US 2024/0171819 A1   May 23, 2024

(30) Foreign Application Priority Data

Jan. 10, 2022   (CN) .......... 202210024058.4

(51) Int. Cl.
*H04N 21/482* (2011.01)
*H04N 21/431* (2011.01)
(Continued)

(52) U.S. Cl.
CPC ..... *H04N 21/4826* (2013.01); *H04N 21/4316* (2013.01); *H04N 21/440263* (2013.01); *H04N 21/4425* (2013.01); *H04N 21/4622* (2013.01)

(58) Field of Classification Search
CPC .......... H04N 21/4622; H04N 21/4316; H04N 21/440263; H04N 21/4425; H04N 5/268; H04N 7/18; H04N 21/4826; G06F 3/14
See application file for complete search history.

(56) References Cited

U.S. PATENT DOCUMENTS

2004/0233124 A1   11/2004   Eggers et al.
2016/0127763 A1*   5/2016   Patel .................. H04N 21/4532
                                                    348/564
(Continued)

FOREIGN PATENT DOCUMENTS

CN   103853512 A   6/2014
CN   104601935 A   5/2015
(Continued)

OTHER PUBLICATIONS

International Search Report for PCT/CN2023/070062 Mailed Mar. 17, 2023.
(Continued)

*Primary Examiner* — John R Schnurr
(74) *Attorney, Agent, or Firm* — Ling Wu; Stephen Yang; Ling and Yang Intellectual Property (57) ABSTRACT

Provided in the present disclosure is a display control method. The method includes: receiving video streams sent by a plurality of video sources, and acquiring a second priority parameter corresponding to each video stream; according to a first priority parameter which is pre-configured for each display area of a display apparatus, and the second priority parameter for each video stream, obtaining a video stream corresponding to each display area; and according to the video stream corresponding to each display area, generating image data, and sending the image data to the display apparatus for display. Further provided in the
(Continued)

(a)

(b)

present disclosure are a display control apparatus, a display device, and a computer-readable medium.

14 Claims, 7 Drawing Sheets

(51) Int. Cl.
    *H04N 21/4402*     (2011.01)
    *H04N 21/4425*     (2011.01)
    *H04N 21/462*     (2011.01)

(56) References Cited

U.S. PATENT DOCUMENTS

2018/0359515 A1* 12/2018 Lee .................... H04N 21/4316
2020/0334790 A1   10/2020 Lee et al.
2020/0388241 A1   12/2020 Uchiyama

FOREIGN PATENT DOCUMENTS

| | | |
|---|---|---|
| CN | 106231259 A | 12/2016 |
| CN | 107317960 A | 11/2017 |
| CN | 107396054 A | 11/2017 |
| CN | 108596834 A | 9/2018 |
| CN | 109862323 A | 6/2019 |
| CN | 110248145 A | 9/2019 |
| CN | 110618803 A | 12/2019 |
| CN | 110858890 A | 3/2020 |
| CN | 110933359 A | 3/2020 |
| CN | 111147770 A | 5/2020 |
| CN | 111782165 A | 10/2020 |
| CN | 111796990 A | 10/2020 |
| CN | 112068786 A | 12/2020 |
| CN | 112243101 A | 1/2021 |
| CN | 113205573 A | 8/2021 |
| CN | 113286114 A | 8/2021 |
| CN | 113542829 A | 10/2021 |
| CN | 113760169 A | 12/2021 |
| CN | 114363533 A | 4/2022 |
| JP | H1028762 A | 2/1998 |
| KR | 1020040084682 A | 10/2004 |

OTHER PUBLICATIONS

Office Action dated Dec. 19, 2023 for Chinese Patent Application No. 202210024058.4 and English Translation.

* cited by examiner

FIG. 4 transform the video stream corresponding to each of the display areas according to the display resolution of each of the display areas — S301

DISPLAY CONTROL METHOD AND APPARATUS, AND DISPLAY DEVICE AND COMPUTER-READABLE MEDIUM

CROSS-REFERENCE TO RELATED APPLICATIONS

The present application is a U.S. National Phase Entry of International Application No. PCT/CN2023/070062 having an international filing date of Jan. 3, 2023, which claims priority of Chinese Patent Application No. 202210024058.4, filed to the CNIPA on Jan. 10, 2022 and entitled "Display Control Method and Apparatus, and Display Device and Computer-Readable Medium". The above-identified applications are hereby incorporated by reference.

TECHNICAL FIELD

The present disclosure relates to the technical field of display, in particular to a display control method, a display control apparatus, a display device and a computer readable medium.

BACKGROUND

In some usage scenarios of display devices (such as monitors), one display device is usually configured with multiple effective input sources. However, at present, the processing for video images transmitted by multiple input sources is relatively simple, and the flexibility of multi-input display is poor, which cannot meet the screen display requirements of some scenarios.

SUMMARY

The present disclosure aims at solving at least one of the technical problems existing in the prior art, and provides a display control method, a display control apparatus, a display device and a computer readable medium.

To achieve the above object, in a first aspect, an embodiment of the present disclosure provides a display control method, including: receiving video streams sent by a plurality of video sources and acquiring a second priority parameter corresponding to each of the video streams; obtaining the video stream corresponding to each of the display areas according to a first priority parameter configured for each of the display areas of the display apparatus in advance and the second priority parameter of the video stream; generating image data according to the video stream corresponding to each of the display areas and sending the image data to the display apparatus for display.

In some embodiments, the method further includes: in response to a first configuration instruction: determining a position and a display resolution of the display area according to position information in the first configuration instruction; determining the first priority parameter corresponding to the display area according to first priority information in the first configuration instruction; in response to a second configuration instruction: determining the second priority parameter corresponding to the video stream according to second priority information in the second configuration instruction.

In some embodiments, after determining the position and the display resolution of the display area according to position information in the first configuration instruction, the method further includes: for the determined display area, marking at least an edge part of the determined display area, wherein each of the display areas corresponds to a different mark type, and the mark type includes at least one of a color and a brightness; displaying the corresponding marked content in the display area.

In some embodiments, after determining the first priority parameter corresponding to the display area according to first priority information in the first configuration instruction, the method further includes: for the determined display area, marking the determined display area internally according to the first priority parameter thereof; displaying the corresponding marked content in the display area.

In some embodiments, after obtaining the video stream corresponding to each of the display areas according to a first priority parameter configured for each of the display areas of the display apparatus in advance and the second priority parameter of the video stream, the method further includes: canceling the displaying of the corresponding marked content in each of the display areas.

In some embodiments, generating image data according to the video stream corresponding to each of the display areas and sending the image data to the display apparatus for display includes: transforming the video stream corresponding to each of the display areas according to the display resolution of each of the display areas.

In some embodiments, obtaining the video stream corresponding to each of the display areas according to a first priority parameter configured for each of the display areas of the display apparatus in advance and the second priority parameter of the video stream, includes: arranging each of the display areas in order of a target sequence according to the first priority parameter to obtain a first arrangement result; arranging each of the video streams in order of the target sequence according to the second priority parameter to obtain a second arrangement result; determining the video stream corresponding to each of the display areas according to the first arrangement result and the second arrangement result.

In some embodiments, arranging each of the display areas in order of the target sequence according to the first priority parameter to obtain a first arrangement result includes: in response to the fact that the first priority parameters corresponding to any two of the display areas are identical, when arranging, regarding the one with earlier configuration time of the corresponding first priority parameter as the one with higher priority, or regarding the one with earlier corresponding regional location determination time as the one with higher priority; arranging each of the video streams in order of the target sequence according to the second priority parameter to obtain a second arrangement result includes: in response to the fact that the second priority parameters corresponding to any two of the video streams are identical, when arranging, regarding the one with earlier configuration time of the corresponding second priority parameter as the one with higher priority.

In some embodiments, the method further includes: detecting each of the display areas according to the first priority parameter, and outputting alarm information when the detection fails, wherein, for any two of the display areas, detecting whether a display resolution of the display area with high priority is greater than or equal to a display resolution of the display area with low priority, and/or detecting whether a first distance corresponding to the display area with high priority is less than or equal to a second distance corresponding to the display area with low priority, wherein the first distance is a distance between a first preset point in the display area with high priority and a second preset point on the display apparatus, and the second distance is a distance between a first preset point in the display area with low priority and the second preset point.

In some embodiments, generating image data according to the video stream corresponding to each of the display areas and sending the image data to the display apparatus for display includes: in response to a plurality of the display areas overlapping, in the overlapping regions, generating the image data according to a video stream corresponding to the display area with highest priority.

In some embodiments, after obtaining the video stream corresponding to each of the display areas according to a first priority parameter configured for each of the display areas of the display apparatus in advance and the second priority parameter of the video stream, including: in response to the number of the display areas being larger than the number of the video streams, determining, according to a preset filling picture, corresponding image data of the display areas without being established correspondence to the video streams; in response to the number of the display areas being less than the number of the video streams, outputting prompt information for prompting the presence of the video streams not displayed.

In a second aspect, an embodiment of the present disclosure further provides a display control apparatus including: a video stream receiving module configured for receiving video streams sent by a plurality of video sources; a priority adaptation module, configured for obtaining a second priority parameter corresponding to each of the video streams; obtaining the video stream corresponding to each of the display areas according to a first priority parameter configured for each of the display areas of the display apparatus in advance and the second priority parameter of the video stream; a display control module, configured for generating image data according to the video stream corresponding to each of the display areas and sending the image data to the display apparatus for display.

In some embodiments, the apparatus further includes: a display area determination module, configured for determining a position where the display area is located and a display resolution thereof according to position information in a first configuration instruction in response to the first configuration instruction; a first priority determination module, configured for determining the first priority parameter corresponding to the display area according to first priority information in the first configuration instruction; a second priority determination module, configured for determining the second priority parameter corresponding to the video stream according to second priority information in a second configuration instruction in response to the second configuration instruction.

In some embodiments, the apparatus further includes: a mark display module, configured for marking at least an edge portion of the determined display area, wherein each of the display areas corresponds to a different marker type, the marker type includes at least one of a color and a brightness; and/or, marking the determined display area internally according to the first priority parameter of the determined display area; the display control module, also used for displaying the corresponding marked content in the display area, and canceling the displaying of the corresponding marked content in each of the display areas after the priority adaptation module obtains the video stream corresponding to each of the display areas according to the first priority parameter of each of the display areas and the second priority parameter of the video stream.

In some embodiments, the apparatus further includes: a transformation module, configured for transforming the video stream corresponding to each of the display areas according to the display resolution of each of the display areas.

In some embodiments, the apparatus further includes: a detection alarm module, configured for detecting each of the display areas according to the first priority parameter, and outputting alarm information when the detection fails, wherein, for any two of the display areas, detecting whether a display resolution of the display area with high priority is greater than or equal to a display resolution of the display area with low priority, and/or detecting whether a first distance corresponding to the display area with high priority is less than or equal to a second distance corresponding to the display area with low priority, wherein the first distance is a distance between a first preset point in the display area with high priority and a second preset point on the display apparatus, and the second distance is a distance between a first preset point in in the display area with low priority and the second preset point.

In a third aspect, an embodiment of the present disclosure further provides a display device, including: a display apparatus and a display control apparatus; the display control apparatus adopts the display control apparatus as described in any of the above embodiments.

In a fourth aspect, an embodiment of the present disclosure further provides a computer readable medium having a computer program stored thereon, wherein the program, when executed, the display control method as described in any of the above embodiments is implemented.

BRIEF DESCRIPTION OF DRAWINGS

The attached drawings are used to provide a further understanding for the present disclosure, and constitute a part of the specification. They are used together with the embodiments of the present disclosure to explain the present disclosure, and do not constitute a restriction on the present disclosure. The above and other features and advantages will become more apparent to those skilled in the art by describing detailed exemplary embodiments with reference to the accompanying drawings, in which.

DETAILED DESCRIPTION

In order for those skilled in the art to better understand the technical schemes of the present disclosure, a display control method, a display control apparatus, a display device and a computer readable medium provided by the present disclosure will be described in detail below in conjunction with the accompanying drawings.

Exemplary embodiments will be described more fully hereinafter with reference to the accompany drawings, but the illustrated exemplary embodiments may be embodied in different forms and should not be construed as limited to the embodiments set forth herein. On the contrary, these embodiments are provided for the purpose of making the present disclosure thorough and complete, and will enable those skilled in the art to fully understand the scope of the present disclosure.

Terms used herein are only used to describe specific embodiments and are not intended to limit the present disclosure. As used herein, the singular forms "a" and "the" are also intended to include the plural forms, unless the context clearly indicates otherwise. It is also understood that, when the present specification is using the terms "including" and/or "made of", it intends to specify the presence of stated features, integers, steps, operations, elements and/or components, but do not exclude the presence or addition of one or more other features, integers, steps, operations, elements, components and/or groups thereof.

It will be understood that while the terms, such as first, second and the like, may be used herein to describe various elements, these elements should not be limited by these terms. These terms are used only to distinguish one element from another. Thus, a first element, a first component, or a first module discussed below may be referred to as a second element, a second component, or a second module in a case of not departing from the teaching of the present disclosure.

Unless otherwise limited, all terms used herein including technical and scientific terms have the same meaning as would normally be understood by those of ordinary skill in the art. It will also be understood that terms such as those defined in commonly used dictionaries should be construed as having meanings consistent with their meanings in the context of the related art and the present disclosure, and will not be construed as having idealized or over-formal meanings unless expressly so defined herein.

Figure 1:
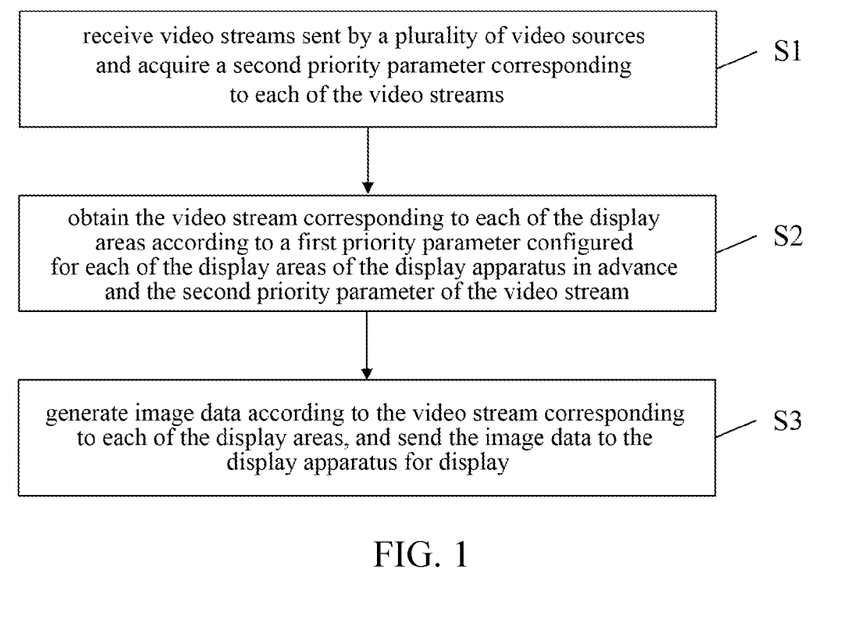
FIG. 1 is a flowchart of a display control method according to an embodiment of the present disclosure.

FIG. 1 is a flowchart of a display control method according to an embodiment of the present disclosure. As shown in FIG. 1, the method includes:

In step S1: receiving video streams sent by a plurality of video sources and acquiring a second priority parameter corresponding to each of the video streams.

Wherein, the second priority parameter is used to characterize the priority of its corresponding video stream, the concept of the priority is formed based on all the video streams, and in particular, the video stream with high priority should be highlighted, in the embodiment of the present disclosure, the video stream with high priority can occupy the corresponding position that the human eye is more interested in or the part with higher attention on the display apparatus.

In some embodiments, the second priority parameter corresponding to each video stream is configured in advance, and the second priority parameter can be obtained from a corresponding storage space; alternatively, in some embodiments, after receiving the video stream, a configuration instruction sent in real time is received, and the second priority parameter corresponding to each of the video streams is determined according to the second priority information therein; alternatively, in some embodiments, each of the video streams carries its respective corresponding second priority parameter based on an extensible coding format.

In some embodiments, the plurality of video sources may correspond to a plurality of input interfaces and corresponding media data coding formats, for example, in some embodiments, the input interface includes a High Definition Multimedia Interface (HDMI), a Display Port (DP), a Digital Serial Interface (SDI), an Ethernet input interface, and the like.

In some embodiments, the second priority parameter may be configured for the video source, whereby there is a correspondence between a particular video source and a corresponding priority, the output video stream of the particular video source still has the priority even if a format change or the like occurs; alternatively, in some embodiments, the second priority parameter may be configured for the video stream, whereby there is a correspondence between a particular coding format or a video stream transmitted from a particular input interface and a corresponding priority.

In step S2: obtaining the video stream corresponding to each of the display areas according to a first priority parameter configured for each of the display areas of the display apparatus in advance and the second priority parameter of the video stream.

In step S2, a relationship between the priority of the display area and the priority of the video stream can be determined according to the first priority parameter and the second priority parameter, thereby establishing a correspondence between the display area and the video stream; wherein, the display apparatus is divided with a plurality of display areas, each of the display areas is provided with a corresponding first priority parameter, the first priority parameter is used to characterize the priority of the corresponding display area, the concept of the priority is formed based on all the display areas and the display apparatus, in particular, the display area with high priority corresponds to the position that the human eye is more interested in or the part with higher attention on the display apparatus.

In step S3: generating image data according to the video stream corresponding to each of the display areas, and sending the image data to the display apparatus for display.

Wherein, the frame image to be displayed for the whole display apparatus is determined according to the video stream corresponding to each of the display areas, thereby generating image data and sending the image data to the display apparatus for display.

In some embodiments, in step S3, generating image data according to the video stream corresponding to each of the display areas and sending the image data to the display apparatus for display includes: in response to the overlapping of a plurality of display areas, in the overlapping area, generating the image data according to the video stream corresponding to the display area with highest priority. Specifically, when different display areas overlap, the display area with high priority will overlap a portion overlapped with the display area with low priority when displaying. It will be appreciated that, in some embodiments, the display areas are not overlapped with each other.

In some embodiments, after obtaining the video stream corresponding to each of the display areas according to a first priority parameter configured for each of the display areas of the display apparatus in advance and the second priority parameter of the video stream, the step S2 includes: in response to the number of the display areas being larger than the number of the video streams, determining corresponding image data of the display areas without established correspondence to the video streams according to a preset filling picture; in response to the number of the display areas being less than the number of the video streams, outputting prompt information for prompting the presence of the video streams not displayed. Specifically, the filling picture can be a monochrome picture, such as a black picture, a red picture, etc., or can be a test inspection picture, such as a color bar picture, etc.; the prompt information may identify the video stream not displayed, and in some embodiments, it further includes outputting the prompt information to the display apparatus for display by the display apparatus in accordance with the prompt information.

Corresponding to the scheme in the related technology, the pictures corresponding to a plurality of video sources have no priority distinction on the screen. Taking four video sources as an example, the pictures corresponding to the four video sources will be displayed on the display apparatus in the form of quartered tiling, so that the highlight effect cannot be realized for a single or a plurality of video streams, and the use requirements of some scenarios cannot be met, such as broadcast-level monitoring scenario, multi-person meeting scenario, multi-camera stage scenario, etc.

An embodiment of the present disclosure provides a display control method, which can be used for receiving video streams sent by a plurality of video sources, obtaining a second priority parameter corresponding to each of the video streams, obtaining the video stream corresponding to each of the display areas according to a first priority parameter of each of the display areas of a display apparatus and the second priority parameter of the video stream, generating image data according to the video stream corresponding to each of the display areas and sending the image data to the display apparatus for display, thereby establishing the correspondence between the display area and the video stream based on the priority of each of the display areas of the display apparatus and the priority of the video streams to realize the highlighted display of the display apparatus in case of the plurality of video sources.

Figure 2:
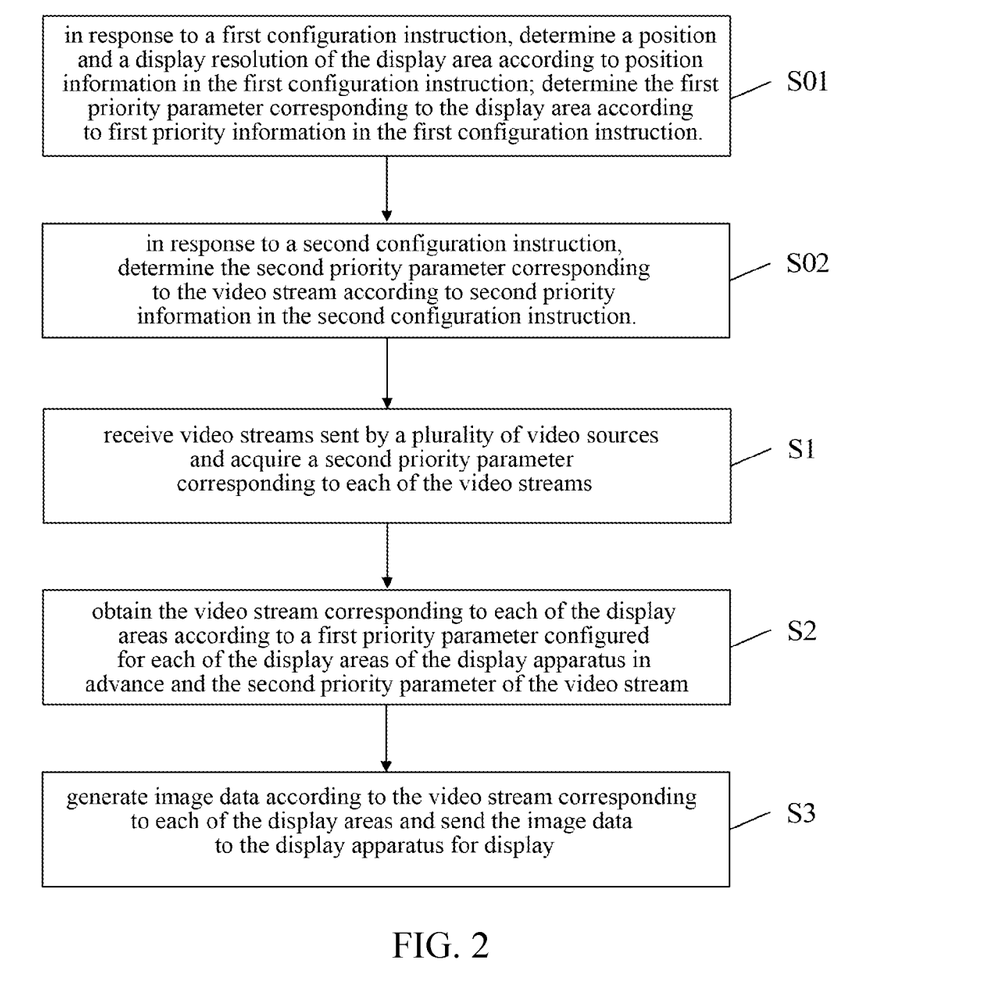
FIG. 2 is a flowchart of another display control method according to an embodiment of the present disclosure.

FIG. 2 is a flowchart of another display control method according to an embodiment of the present disclosure. As shown in FIG. 2, the method is a specific and optional implementation based on the method shown in FIG. 1. Specifically, the method includes not only steps S1 to S3, but also steps S01 and S02. The following will be described in detail only with respect to steps S01 and S02.

In Step S01: in response to a configuration instruction, determining a position and a display resolution of the display area according to position information in the first configuration instruction; determining the first priority parameter corresponding to the display area according to first priority information in the first configuration instruction.

In Step S02: in response to a second configuration instruction, determining the second priority parameter corresponding to the video stream according to second priority information in the second configuration instruction.

In some embodiments, the display area may be in a regular shape, such as a rectangle or the like. Taking the display area as a rectangle as an example, the position information in the first configuration instruction can include coordinates of two specific positions, such as coordinates of vertexes connected by a diagonal line of the rectangle, etc. Based on the coordinates of the two positions, the position and the display resolution of the display area can be determined; if the display resolution of the display apparatus is M*N, a minimum display resolution corresponding to the display area is M/x*N/x, where x is a parameter that can vary with the display resolution of the display apparatus. For example, in some embodiments, when the display resolution of the display screen is a Full High Definition (FHD) resolution (1920*1080 or 2048*1080), x may be 100, when the display resolution of the display screen is 4K resolution (3840*2160 or 4096*2160), x may be 200, and when the display resolution of the display screen is 8K resolution (7680*4320 or 8192*4320), x may be 400. In the case where M or N cannot be exactly divided by x, the result can be rounded up or down or rounded off to obtain the minimum display resolution.

In some embodiments, the user can configure the display area based on an interactive interface and an interactive apparatus, wherein the interactive interface can be an image interface, and the interactive apparatus can be based on button input control, touch input control, keyboard and mouse input control, and the like. In some embodiments, the user issues one first configuration instruction every time the user completes the configuration of one display area or the modification of the original configuration information of one display area; alternatively, in some embodiments, the user issues one first configuration instruction after the user completes the configuration of all display areas or the modification of the original configuration information of all display areas. Accordingly, in some embodiments, the user issues one second configuration instruction every time the user completes the configuration of one video stream or the modification of the original configuration information of one video stream; alternatively, in some embodiments, the user issues one second configuration instruction after the user completes the configuration of all video streams or the modification of the original configuration information of all video streams.

It should be noted that the embodiment of the present disclosure does not limit the execution order of steps S1 to S3 and steps S01 to S02. That is, steps S01 to S02 may be performed prior to steps S1 to S3, specifically corresponding to a case where, in some embodiments, configuration of the display area and the video stream is completed in advance; alternatively, the steps S01 to S02 may be executed after the steps S1 to S3; alternatively, the steps S01 to S02 may be executed interspersed with the steps S1 to S3, specifically corresponding to a case where, in some embodiments, the user performs real-time configuration when the display of the video stream has been performed or the display of the video stream is ready to be performed.

Figure 3:
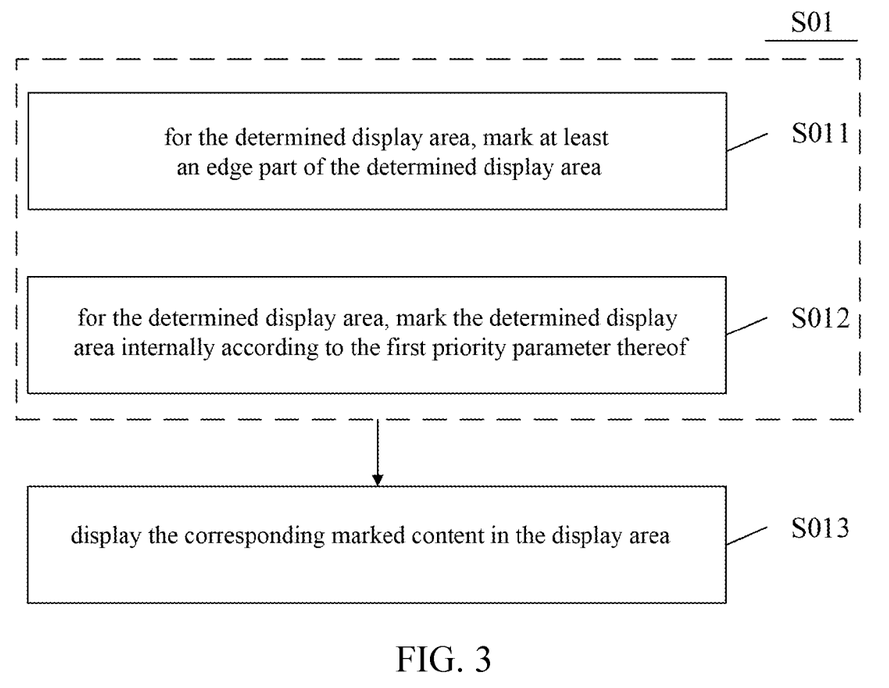
FIG. 3 is a flowchart of a specific implementation method of step S01 according to an embodiment of the present disclosure.

FIG. 3 is a flowchart of a specific implementation method of step S01 according to an embodiment of the present disclosure. As shown in FIG. 3, after the step of determining the position and the display resolution of the display area according to position information in the first configuration instruction, the step S01 further includes step S011.

In Step S011: for the determined display area, marking at least an edge part of the determined display area, wherein, each of the display areas corresponds to a different mark type, and the mark type includes at least one of a color and a brightness, whereby each of the display areas is marked by a different color and/or brightness; in some embodiments edge portions of the display areas are marked; alternatively, in some embodiments, both edge portions and the interior of the display areas are marked.

And, in some embodiments, as shown in FIG. 3, after the step of determining the first priority parameter corresponding to the display area according to first priority information in the first configuration instruction, the step S01 further includes: step S012.

In Step S012: for the determined display area, marking the determined display area internally according to the first priority parameter thereof.

Wherein, the priority of the display area can be marked internally by corresponding text or character identification.

In some embodiments, the marked content is determined and marked by means of random selection; alternatively, in some embodiments, the marked content may be determined and marked according to a marking manner preset by a user; alternatively, in some embodiments, the marked content is determined and marked according to a marking manner currently selected by the user.

And, after step S011 and/or step S012, a step S013 is further included.

In Step S013: displaying the corresponding marked content in the display area.

Wherein, the marked content is a marking result based on the above color and/or brightness and a marking result for the priority.

Figure 4:
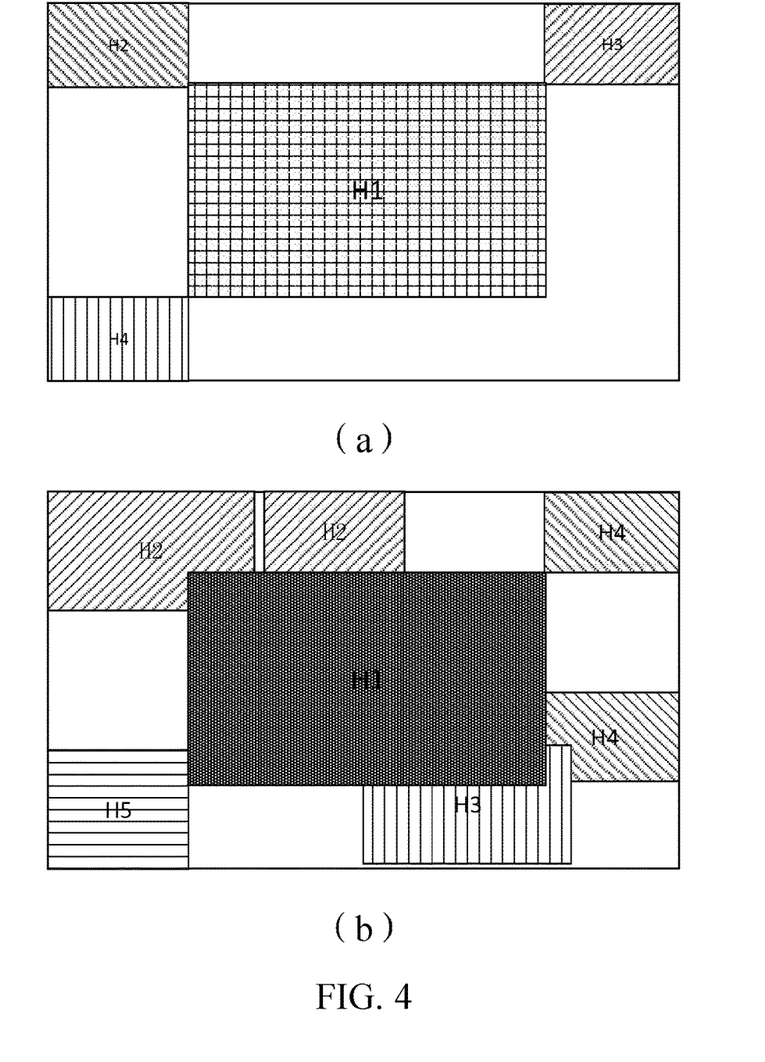
FIG. 4 is a schematic diagram of a display area according to an embodiment of the present disclosure.

FIG. 4 is a schematic diagram of a display area according to an embodiment of the present disclosure. As shown in FIG. 4, it exemplarily shows a marking manner of display areas, wherein, different filling patterns are used to identify different display areas, and it can be understood that the aforementioned different colors and/or brightness can identify different display areas; the priorities of different display areas are identified with H1, H2, H3, H4 and H5; in (a), it shows a case where a plurality of display areas have no overlapped portions, and different display areas have different priorities; in (b), it is shown that a plurality of display areas are overlapped and different display areas may have the same priority.

In some embodiments, after the step of obtaining the video stream corresponding to each of the display areas according to a first priority parameter configured for each of the display areas of the display device in advance and the second priority parameter of the video stream, the step S2 further includes: canceling the displaying of the corresponding marked content in each of the display areas. Thereby, after the priority configuration of the display areas is completed and the video stream corresponding to each of the display areas is determined, the display area no longer displays marked contents such as a specific color, a specific brightness, and identification, but prepares to display image data of the corresponding video stream.

Figure 5:
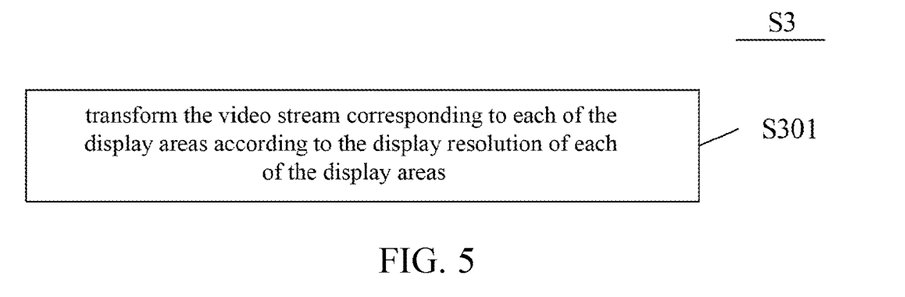
FIG. 5 is a flowchart of a specific implementation method of step S3 according to an embodiment of the present disclosure.

FIG. 5 is a flowchart of a specific implementation method of step S3 according to an embodiment of the present disclosure. As shown in FIG. 5, the step S3 is a step of generating image data according to the video stream corresponding to each of the display areas and sending the image data to the display device for display, which includes step S301.

In Step S301: transforming the video stream corresponding to each of the display areas according to the display resolution of each of the display areas.

Wherein, transforming the video stream according to the display resolution of each of the display areas may include up-sampling and down-sampling. Specifically, because the display resolution of the display area drawn and determined by the user is not necessarily the same as the original resolution of the video stream, the video stream needs to adapt the resolution according to the corresponding display area.

For example, when the display area is rectangular, one side of the display area and the image picture corresponding to the video stream in the row direction is regarded as length, and one side in the column direction is regarded as width. In some embodiments, the aforementioned display resolution is proportional to the original resolution, that is, a ratio e is equal to a length M of the display area to a length m of the image picture of the video stream, and the ratio e is also equal to a width N of the display area to a width n of the image picture of the video stream, then the resolution of the video stream can be enlarged or reduced based on the ratio e, the length-width ratio remains unchanged, and the corresponding image picture will not be deformed. Alternatively, in some embodiments, the display resolution is not proportional to the original resolution, that is, a ratio e1 is equal to the length M of the display area to the length m of the image picture of the video stream, and a ratio e2 is also equal to the width N of the display area to the width n of the image picture of the video stream, and e1 and e2 are not equal, which can be divided into the following situations: if $e1>e2>1$, the video stream can be stretched in length and width according to the ratio e2, corresponding to the process of amplification and up sampling; if $e2>e1>1$, the video stream can be stretched in length and width according to the ratio e1; if $e1<e2<1$, the video stream can be compressed in length and width according to the ratio e2, corresponding to the process of reduction and down sampling; if $e2<e1<1$, the video stream can be compressed in length and width according to the ratio e1; if $e1<1<e2$, the video stream can be compressed in length and width according to the ratio e1; if $e2<1<e1$, the video stream can be compressed in length and width according to the ratio e2; wherein, the resolution of the video stream is stretched or compressed according to the same proportion, and the resolution of the corresponding image picture changes but the length-width ratio of the picture does not change; in addition, because the resolutions of the display area and the video stream are different, after the video stream is stretched or compressed, only one side of the length and width of the video stream is consistent with the length or width of the display area, and the other side is smaller than the length or width of the display area, so it is needed to ensure that the image data of the video stream is centrally displayed in the direction corresponding to the inconsistent side.

Figure 6:
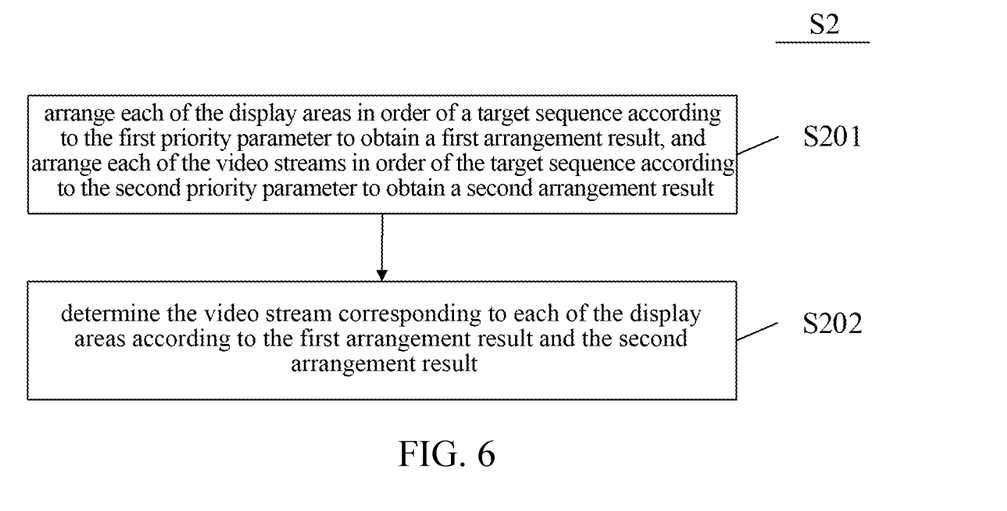
FIG. 6 is a flowchart of a specific implementation method of step S2 according to an embodiment of the present disclosure.

FIG. 6 is a flowchart of a specific implementation method of step S2 according to an embodiment of the present disclosure. As shown in FIG. 6, the step S2 is a step of obtaining the video stream corresponding to each of the display areas according to a first priority parameter configured for each of the display areas of the display device in advance and the second priority parameter of the video stream, which includes step S201 and step S202.

In Step S201: arranging each of the display areas in order of a target sequence according to the first priority parameter to obtain a first arrangement result, and arranging each of the video streams in order of the target sequence according to the second priority parameter to obtain a second arrangement result.

Wherein, the target sequence can be the sequence where the priority is from high to low or from low to high.

In some embodiments, in the step S201, arranging each of the display areas in order of a target sequence according to the first priority parameter to obtain a first arrangement result includes: in response to the fact that the first priority parameters corresponding to any two of the video streams are identical, when arranging, regarding the one corresponding to earlier configuration time of the first priority parameter as the one with higher priority, or the one corresponding to earlier regional location determination time as the one with higher priority;

And, in some embodiments, in the step 201, arranging each of the video streams in order of the target sequence according to the second priority parameter to obtain a second arrangement result includes: in response to the fact that the second priority parameters corresponding to any two of the video streams are identical, when arranging, regarding the one corresponding to earlier configuration time of the second priority parameter as the one with higher priority.

In Step S202: determining the video stream corresponding to each of the display areas according to the first arrangement result and the second arrangement result.

Wherein, a one-to-one correspondence between the display area and the video stream is established according to the first arrangement result and the second arrangement result obtained based on the target sequence arrangement.

Figure 7:
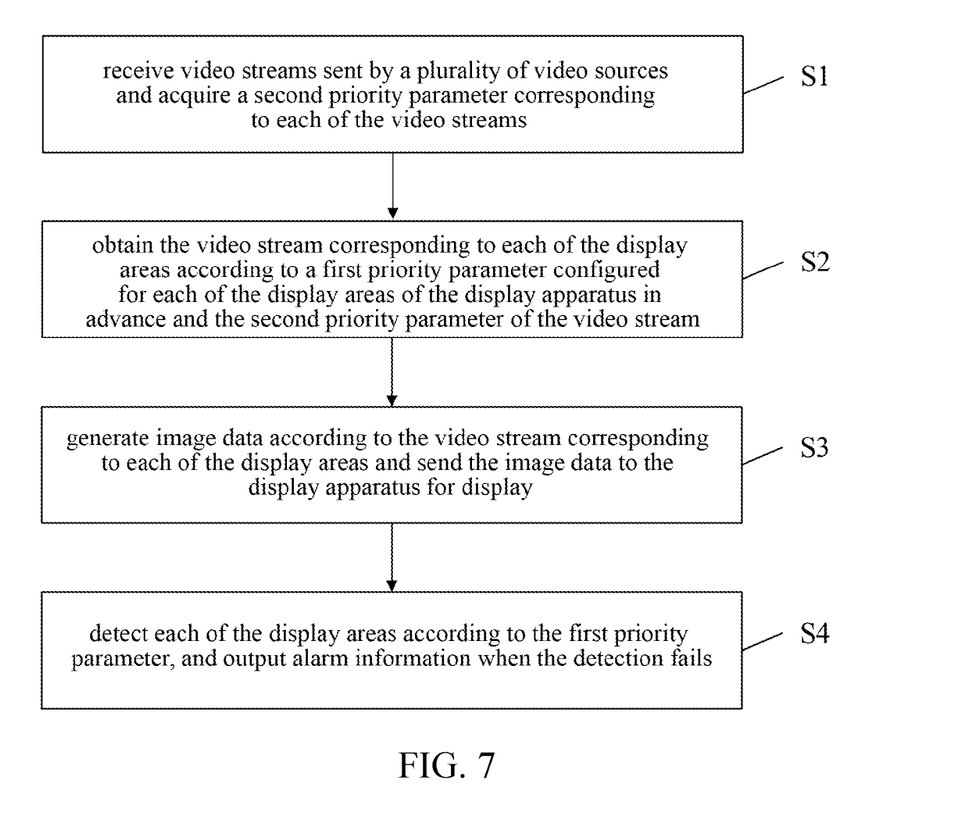
FIG. 7 is a flowchart of yet another display control method according to an embodiment of the present disclosure.

FIG. 7 is a flowchart of yet another display control method according to an embodiment of the present disclosure. As shown in FIG. 7, the method is a specific and optional implementation based on the method shown in FIG. 1. Specifically, the method includes not only steps S1 to S3, but also steps S4. Only step S4 is described in detail below.

In Step S4: detecting each of the display areas according to the first priority parameter, and outputting alarm information when the detection fails.

Wherein, for any two of the display areas, detecting whether a display resolution of the display area with high priority is greater than or equal to a display resolution of the display area with low priority, and/or detecting whether a first distance corresponding to the display area with high priority is less than or equal to a second distance corresponding to the display area with low priority, wherein the first distance is a distance between a first preset point in the display area with high priority and a second preset point on the display apparatus, and the second distance is a distance between a first preset point in the display area with low priority and the second preset point. Specifically, based on the human eye perception characteristics, in order to achieve highlighted display, it is needed to ensure that the display area with high priority occupies a larger area of the display apparatus and/or is located closer to a position of interest to the human eye. In some embodiments, a first preset point within the display area is a center point of the display area and a second preset point on the display apparatus is a center point of the display apparatus.

Figure 8:
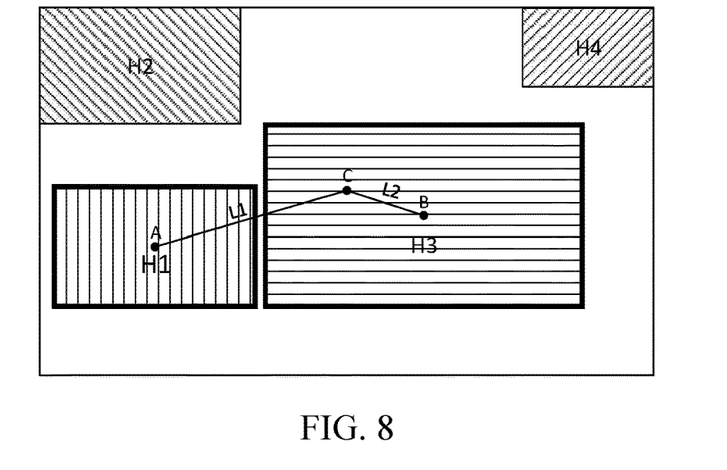
FIG. 8 is a schematic diagram of another display area according to an embodiment of the present disclosure.

FIG. 8 is a schematic diagram of another display area according to an embodiment of the present disclosure. As shown in FIG. 8, it shows a case in which the display areas with priority H1 and H3 are detected. Specifically, if the display resolution corresponding to the display area with priority H1 is smaller than the display resolution corresponding to the display area with priority H3, the detection fails and alarm information is output; if a distance between a first preset point A in the display area with priority H1 and a second preset point C of the display apparatus is smaller than a distance between a first preset point B in the display area with priority H3 and the second preset point C of the display apparatus, the detection fails and the alarm information is output. In some embodiments, as shown in FIG. 8, the display area is alerted based on the alarm information. The alarm mark result is represented by a thick frame line in FIG. 8. It is understood that the alarm mark may be performed by a colored frame line, such as a red frame line or the like.

Figure 9:
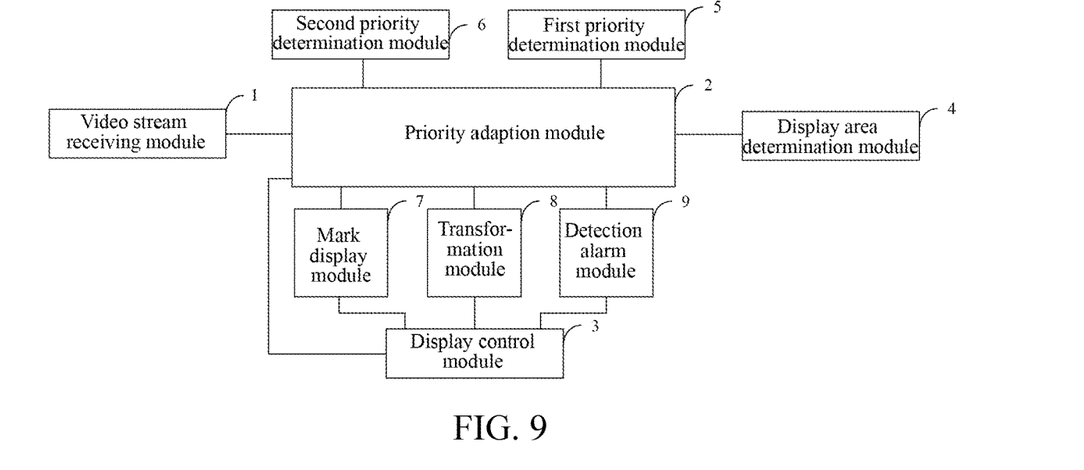
FIG. 9 is a schematic diagram of a structure of a display control apparatus according to an embodiment of the present disclosure.

FIG. 9 is a schematic diagram of a structure of a display control apparatus according to an embodiment of the present disclosure. As shown in FIG. 9, the display control apparatus includes a video stream receiving module 1, a priority adaption module 2, and a display control module 3.

The video stream receiving module 1 is configured for receiving video streams transmitted from a plurality of video sources.

The priority adaptation module 2 is configured for obtaining a second priority parameter corresponding to each of the video streams; obtaining the video stream corresponding to each of the display areas according to a first priority parameter configured for each of the display areas of the display apparatus in advance and the second priority parameter of the video stream;

The display control module 3 is configured for generating image data according to the video stream corresponding to each of the display areas and sending the image data to the display apparatus for display.

In some embodiments, as shown in FIG. 9, the apparatus further includes a display area determination module 4, a first priority determination module 5, and a second priority determination module 6.

The display area determination module 4 is configured for determining a position where the display area is located and a display resolution thereof according to position information in a first configuration instruction in response to the first configuration instruction.

The first priority determination module 5 is configured for determining the first priority parameter corresponding to the display area according to first priority information in the first configuration instruction.

The second priority determination module 6 is configured for determining the second priority parameter corresponding to the video stream according to second priority information in a second configuration instruction in response to the second configuration instruction.

In some embodiments, as shown in FIG. 9, the apparatus further includes a mark display module 7.

The mark display module 7 is configured for marking at least an edge portion of the determined display area for the determined display area, wherein each of the display areas corresponds to a different marker type, the marker type includes at least one of a color and a brightness; and/or, marking the determined display area internally according to the first priority parameter of the determined display area for the determined display area.

The display control module is further used for displaying the corresponding marked content in the display area and canceling the displaying of the corresponding marked content in each of the display areas after the priority adaptation module 2 obtains the video stream corresponding to each of the display areas according to the first priority parameter of each of the display areas and the second priority parameter of the video stream.

In some embodiments, as shown in FIG. 9, the apparatus further includes a transformation module 8.

The transformation module 8 is configured for transforming the video stream corresponding to each of the display areas according to the display resolution of each of the display areas.

In some embodiments, as shown in FIG. 9, the apparatus further includes a detection alarm module 9.

The detection alarm module 9 is configured for detecting each of the display areas according to the first priority parameter, and outputting alarm information when the detection fails, wherein, for any two of the display areas, detecting whether a display resolution of the display area with high priority is greater than or equal to a display resolution of the display area with low priority, and/or detecting whether a first distance corresponding to the display area with high priority is less than or equal to a second distance corresponding to the display area with low priority, wherein the first distance is a distance between a first preset point in the display area with high priority and a second preset point on the display apparatus, and the second distance is a distance between a first preset point in the display area with low priority and the second preset point.

Figure 10:
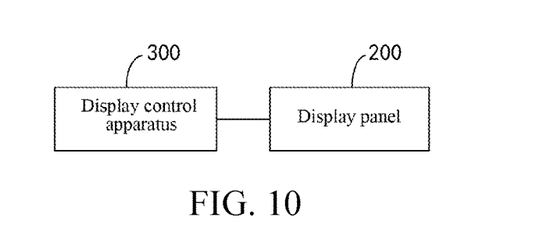
FIG. 10 is a schematic diagram of a display device according to some embodiments of the present disclosure.

FIG. 10 is a schematic diagram of a display device according to some embodiments of the present disclosure. As shown in FIG. 10, the display device includes a display panel 200 and the display control apparatus 300 described above. The display panel 200 is used for displaying according to the image data output by the display control apparatus 300. In some embodiments, in particular, the display device may be a monitor device.

Figure 11:
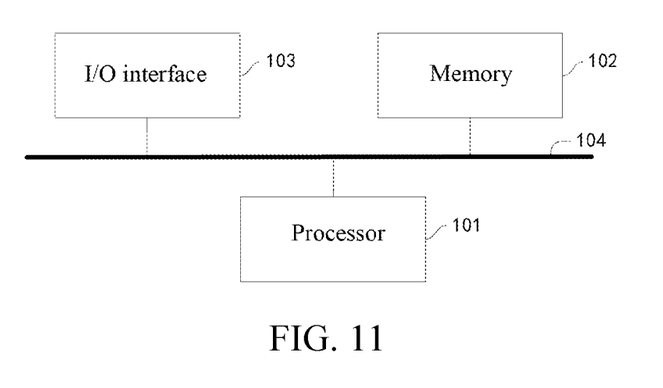
FIG. 11 is a block diagram of an electronic device according to an embodiment of the present disclosure.

FIG. 11 is a block diagram of an electronic device according to an embodiment of the present disclosure. As shown in FIG. 11, the electronic device includes one or more processors 101, a memory 102, and one or more I/O interfaces 103. One or more memory 102 have one or more programs stored thereon, and when the one or more programs are executed by the one or more processors, the one or more processors 101 implement the display control method as in any of the above embodiments. One or more I/O interfaces 103 are connected between the processor and the memory and configured to enable information interaction between the processor and the memory.

The processor 101 is a device with data processing capability, including but not limited to a central processing unit (CPU) and the like; the memory 102 is a device with data storage capability including but not limited to random access memory (RAM, more specifically SDRAM, DDR, etc.), read only memory (ROM), electrically erasable programmable read only memory (EEPROM), FLASH memory (FLASH); the I/O interface (read-write interface) 103 is connected between the processor 101 and the memory 102, and can implement information interaction between the processor 101 and the memory 102, including but not limited to a data Bus (Bus) and the like.

In some embodiments, the processor 101, the memory 102, and the I/O interface 103 are connected to each other via a bus 104, so as to be connected with other components of the computing device.

In some embodiments, the plurality of processors 101 may include a plurality of graphics processors (GPU).

Figure 12:
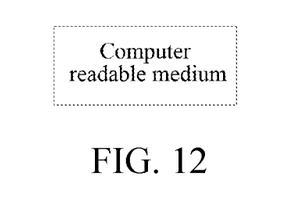
FIG. 12 is a block diagram of a computer readable medium according to an embodiment of the present disclosure.

FIG. 12 is a block diagram of a computer readable medium according to an embodiment of the present disclosure. A computer program is stored on the computer-readable medium, wherein, when the computer program is executed by a processor, the display control method as in any of the aforementioned embodiments is implemented.

Those of ordinary skills in the art may understand that all or some of acts in the methods disclosed above, functional modules or units in apparatuses may be implemented as software, firmware, hardware, and an appropriate combination thereof. In a hardware implementation mode, division between functional modules/units mentioned in the above description does not necessarily correspond to division of physical components. For example, a physical component may have multiple functions, or a function or an act may be performed by several physical components in cooperation. Some physical components or all physical components may be implemented as software executed by a processor such as a central processor, a digital signal processor or a microprocessor, or implemented as hardware, or implemented as an integrated circuit such as a specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile and nonvolatile, and removable and irremovable media implemented in any method or technology for storing information (for example, a computer-readable instruction, a data structure, a program module, or other data). The computer storage medium includes, but is not limited to, a RAM, a ROM, an EEPROM, a flash memory or another memory technology, a CD-ROM, a Digital Versatile Disk (DVD) or another optical disk storage, a magnetic cartridge, a magnetic tape, magnetic disk storage or other magnetic storage apparatuses, or any other medium that may be used for storing desired information and may be accessed by a computer. In addition, it is known to those of ordinary skills in the art that the communication medium usually includes a computer-readable instruction, a data structure, a program module, or other data in a modulated data signal, such as, a carrier or other transmission mechanism, and may include any information delivery medium.

Example embodiments have been disclosed herein, and although specific terms are employed, they are only used and should only be interpreted in a general illustrative sense, and are not used for the purpose of limitation. In some examples, it is obvious to those skilled in the art that the features, characteristics and/or elements described in connection with specific embodiments may be used alone or in combination with those described in connection with other embodiments, unless explicitly stated otherwise. Therefore, it will be understood by those skilled in the art that various changes in form and details may be made without departing from the scope of the present disclosure as set forth in the appended claims.

The invention claimed is:

1. A display control method, comprising:
receiving video streams sent by a plurality of video sources and acquiring a second priority parameter corresponding to each of the video streams;
obtaining a video stream corresponding to each of display areas according to a first priority parameter configured for each of the display areas of a display apparatus in advance and the second priority parameter of the video stream; and
generating image data according to the video stream corresponding to each of the display areas and sending the image data to the display apparatus for display-,
wherein obtaining the video stream corresponding to each of the display areas according to a first priority parameter configured for each of the display areas of the display apparatus in advance and the second priority parameter of the video stream comprises:
arranging each of the display areas in order of a target sequence according to the first priority parameter to obtain a first arrangement result; arranging each of the video streams in order of the target sequence according to the second priority parameter to obtain a second arrangement result; and determining the video stream corresponding to each of the display areas according to the first arrangement result and the second arrangement result, wherein arranging each of the display areas in order of the target sequence according to the first priority parameter to obtain the first arrangement result comprises:

in response to that first priority parameters corresponding to any two of the display areas are identical, when arranging, regarding the one with earlier configuration time of the corresponding first priority parameter as the one with higher priority, or regarding the one with corresponding earlier regional location determination time as the one with higher priority.

2. The display control method according to claim 1, further comprising:

in response to a configuration instruction: determining a position and a display resolution of a display area according to position information in the first configuration instruction; determining the first priority parameter corresponding to the display area according to first priority information in the first configuration instruction; and in response to a second configuration instruction: determining the second priority parameter corresponding to the video stream according to second priority information in the second configuration instruction.

3. The display control method according to claim 2, wherein after determining the position and the display resolution of the display area according to the position information in the first configuration instruction, the method further comprises:

for a determined display area, marking at least an edge part of the determined display area, wherein each of the display areas corresponds to a different mark type, and the mark type comprises at least one of a color and a brightness; and displaying a corresponding marked content in the display area.

4. The display control method according to claim 3, wherein after obtaining the video stream corresponding to each of the display areas according to the first priority parameter configured for each of the display areas of the display apparatus in advance and the second priority parameter of the video stream, the method further comprises:

canceling displaying the corresponding marked content in each of the display areas.

5. The display control method according to claim 2, wherein after determining the first priority parameter corresponding to the display area according to the first priority information in the first configuration instruction, the method further comprises:

marking the determined display area internally according to the first priority parameter of the determined display area; and displaying a corresponding marked content in the display area.

6. The display control method according to claim 5, wherein after obtaining the video stream corresponding to each of the display areas according to the first priority parameter configured for each of the display areas of the display apparatus in advance and the second priority parameter of the video stream, the method further comprises:

canceling displaying the corresponding marked content in each of the display areas.

7. The display control method according to claim 1, wherein generating image data according to the video stream corresponding to each of the display areas and sending the image data to the display apparatus for display comprises:

transforming the video stream corresponding to each of the display areas according to a display resolution of each of the display areas.

8. The display control method of claim 1, further comprising:

detecting each of the display areas according to the first priority parameter, and outputting alarm information when the detection fails, wherein for any two of the display areas, detecting whether a display resolution of the display area with high priority is greater than or equal to a display resolution of the display area with low priority, and/or detecting whether a first distance corresponding to the display area with high priority is less than or equal to a second distance corresponding to the display area with low priority, wherein the first distance is a distance between a first preset point in the display area with high priority and a second preset point on the display apparatus, and the second distance is a distance between a first preset point in the display area with low priority and the second preset point.

9. The display control method according to claim 1, wherein generating image data according to the video stream corresponding to each of the display areas and sending the image data to the display apparatus for display comprises:

in response to a plurality of the display areas overlapping, in the overlapping regions, generating the image data according to a video stream corresponding to the display area with highest priority.

10. The display control method according to claim 1, wherein after obtaining the video stream corresponding to each of the display areas according to a first priority parameter configured for each of the display areas of the display apparatus in advance and the second priority parameter of the video stream, the method comprises:

in response to a quantity of the display areas being larger than a quantity of the video streams, determining, according to a preset filling picture, corresponding image data of the display areas without established a correspondence with the video streams; and in response to the quantity of the display areas being less than the quantity of the video streams, outputting prompt information for prompting a presence of the video streams not displayed.

11. The display control method according to claim 1, wherein arranging each of the video streams in order of the target sequence according to the second priority parameter to obtain the second arrangement result comprises:

in response to that second priority parameters corresponding to any two of the video streams are identical, when arranging, regarding the one with earlier configuration time of the corresponding second priority parameter as the one with higher priority.

12. A display control apparatus, comprising: a processor, and a memory stored computer program instructions, wherein when the computer program instructions are executed by the processor, the method according to claim 1 is implemented.

13. A display device, comprising: a display apparatus and the display control apparatus according to claim 12.

14. A non-transitory computer readable medium, having a computer program stored thereon, when the program is executed, the method according to claim 1 is implemented.

* * * * *